US010269120B2

(12) United States Patent
Kao et al.

(10) Patent No.: US 10,269,120 B2
(45) Date of Patent: Apr. 23, 2019

(54) CHARACTER RECOGNITION SYSTEMS AND CHARACTER RECOGNITION METHODS THEREOF USING CONVOLUTIONAL NEURAL NETWORK

(71) Applicant: Industrial Technology Research Institute, Hsinchu (TW)

(72) Inventors: Chih-Chung Kao, Pingtung County (TW); Hao-Ping Kang, Taipei (TW); Jia-Hua Wu, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 63 days.

(21) Appl. No.: 15/491,902

(22) Filed: Apr. 19, 2017

(65) Prior Publication Data

US 2018/0150956 A1 May 31, 2018

(30) Foreign Application Priority Data

Nov. 25, 2016 (TW) .............................. 105138810 A (51) Int. Cl.
*G06K 9/00* (2006.01)
*G06K 9/46* (2006.01)
(Continued)

(52) U.S. Cl.
CPC ............ *G06T 7/11* (2017.01); *G06K 9/00624* (2013.01); *G06K 9/4604* (2013.01);
(Continued)

(58) Field of Classification Search
CPC ............ G06T 7/11; G06T 2207/20084; G06T 2207/10016; G06T 2207/20021;
(Continued)

(56) References Cited

U.S. PATENT DOCUMENTS 6,028,956 A 2/2000 Shustorovich et al.
7,664,343 B2 2/2010 Withum et al.
(Continued)

FOREIGN PATENT DOCUMENTS

CN 104484658 4/2015
CN 104850845 8/2015
(Continued)

OTHER PUBLICATIONS

S. Roy et al., "A New Multi-modal Technique for Bib Number/Text Detection in Natural Images," LNCS, Nov. 2015, pp. 483-494, vol. 9314, Springer International Publishing, CH.
(Continued)

*Primary Examiner* — Wesley J Tucker (57) ABSTRACT

A character recognition method is provided, including the steps of: recognizing a character string, which includes one or more characters, in a region of interest (ROI) using a first convolutional neural network (CNN) model to generate a recognized character string; and comparing the recognized character string with a plurality of character strings in a character database to find a character string corresponding to the recognized character string, wherein each of the character strings includes one or more characters; wherein if the character string corresponding to the recognized character string is found, the recognized character string is used as a character recognition result, otherwise, using a second CNN model to correct the recognized string and generate a new recognized character string as the character recognition result.

20 Claims, 7 Drawing Sheets

(51) Int. Cl.
*G06K 9/62* (2006.01)
*G06N 3/04* (2006.01)
*G06T 7/11* (2017.01)

(52) U.S. Cl.
CPC ......... *G06K 9/4628* (2013.01); *G06K 9/6271* (2013.01); *G06N 3/0454* (2013.01); *G06K 2209/01* (2013.01); *G06T 2207/10016* (2013.01); *G06T 2207/20021* (2013.01); *G06T 2207/20084* (2013.01)

(58) Field of Classification Search
CPC ............. G06N 3/0454; G06K 9/00624; G06K 9/6271; G06K 9/4628; G06K 9/4604; G06K 2209/01
See application file for complete search history.

(56) References Cited

U.S. PATENT DOCUMENTS

| | | | |
|---|---|---|---|
| 7,876,352 | B2 | 1/2011 | Martin |
| 8,965,112 | B1 | 2/2015 | Ibarz et al. |
| 9,251,431 | B2 | 2/2016 | Doepke et al. |
| 10,007,863 | B1* | 6/2018 | Pereira ................. G06K 9/4671 |
| 2003/0123732 | A1* | 7/2003 | Miyazaki ........... G06K 9/00449 |
| | | | 382/186 |
| 2008/0008383 | A1* | 1/2008 | Andel ..................... G06K 9/00 |
| | | | 382/173 |
| 2011/0222724 | A1 | 9/2011 | Yang et al. |
| 2013/0238709 | A1 | 9/2013 | Martin |
| 2014/0363074 | A1 | 12/2014 | Dolfing et al. |
| 2015/0117760 | A1 | 4/2015 | Wang et al. |
| 2017/0024626 | A1* | 1/2017 | Inaba ................. G06K 9/00724 |
| 2017/0177965 | A1* | 6/2017 | Gordo Soldevila ..... G06K 9/66 |
| 2018/0025256 | A1* | 1/2018 | Bai .......................... G06K 9/62 |
| | | | 382/229 |
| 2018/0082123 | A1* | 3/2018 | Katz .................. H04N 21/2187 |
| 2018/0107877 | A1* | 4/2018 | Inaba ....................... G06T 7/00 |

FOREIGN PATENT DOCUMENTS

| | | |
|---|---|---|
| CN | 104992167 | 10/2015 |
| TW | 591545 | 6/2004 |
| TW | I221587 | 10/2004 |
| TW | I286708 | 9/2007 |
| TW | 201419168 | 5/2014 |
| TW | I522934 | 2/2016 |
| TW | 201636900 | 10/2016 |

OTHER PUBLICATIONS

D.S. Cherneta et al., "Development of Multistage Algorithm for Text Objects Recognition in Images," 2016 International Siberian Conference on Control and Communications (SIBCON), May 2016, 5 pages, IEEE, US.

Wu et al., "Handwritten Character Recognition by Alternately Trained Relaxation Convolutional Neural Network," 2014 ICFHR, Sep. 2014, pp. 291-296, IEEE, US.

Fu et al., "LightBib: Marathoner Recognition System with Visible Light Communications," 2015 IEEE International Conference on Data Science and Data Intensive Systems, Dec. 2015, pp. 572-578, IEEE, US.

Goodfellow et al., "Multi-digit Number Recognition from Street View Imagery using Deep Convolutional Neural Networks," Apr. 2014, pp. 1-13, Google Reserach, US.

Ben-Ami et al., "Racing Bib Number Recognition," School of Electrical Engineering, 2011, 10 pages, Tel Aviv University, IL.

Taiwan Patent Office, Notice of Allowance, Patent Application Serial No. 105138810, dated Nov. 25, 2016, Taiwan.

* cited by examiner

CHARACTER RECOGNITION SYSTEMS AND CHARACTER RECOGNITION METHODS THEREOF USING CONVOLUTIONAL NEURAL NETWORK

CROSS REFERENCE TO RELATED APPLICATIONS

The present application is based on, and claims priority from, Taiwan (International) Application Serial Number 105138810, filed on Nov. 25, 2016, the disclosure of which is hereby incorporated by reference herein in its entirety.

TECHNICAL FIELD

The technical field relates to a character recognition system and character recognition method thereof using convolutional neural network.

BACKGROUND

Driven by the prevailing atmosphere of the sport and the demands of the users, a large number of photographs or videos are recorded in each of the sports event (Marathons, races, games, . . . etc.). More and more sponsors or sports websites provide services for athletes to search for photos or videos (films) using the characters (for example, numbers, etc.) marked on a number cloth (also referred to as "bib number") so that participants could search for their own photos or videos after the racing event and share them to a social network. Generally, such recognition is performed through a computer for image analyzing and processing. However, as the displacement and deformation of the number cloth(s) in a photograph or video makes the recognition rate of characters on a number cloth low by recognition using the computer, it is now mostly performed by hiring a large number of laborers for manual recognition to mark the characters on the number cloth(s) on a photograph or a video, thereby spending a lot of manpower, time and cost.

Recently, with the improvement of the neural network technology, the recognition effect is greatly improved compared with the previous technologies, and the neural network may be widely used, for example, for text recognition. Conventionally, the text recognition of neural networks may include the text detection, text segmentation and character recognition etc. steps. Although the use of neural networks may enhance the recognition effect, the characters on a number cloth is susceptible to the distortions of the number cloth and thus may not be completely segment during the recognition, leading to the subsequent optical character recognition (OCR) prone to errors and affecting the accuracy of the text recognition.

SUMMARY

In an exemplary embodiment, a character recognition method applied to a character recognition system including a storage device and an image processor is provided. The character recognition method comprises the steps of recognizing a character string, which includes one or more characters, in a region of interest (ROI) using a first convolutional neural network (CNN) model to generate a recognized character string. The method further comprises the step of comparing the recognized character string with a plurality of character strings in a character database to find a character string corresponding to the recognized character string, wherein each of the plurality of character strings includes one or more characters; wherein if the character string corresponding to the recognized character string is found, using the recognized character string as a character recognition result, otherwise, using a second CNN model to correct the recognized character string and generate a new recognized character string as the character recognition result.

Another exemplary embodiment of a character recognition system includes a storage device and an image processor. The storage device is configured to store a character database. The image processor is coupled to the storage device and is configured to recognize a character string, which includes one or more characters, in a region of interest (ROI) using a first convolutional neural network (CNN) model to generate a recognized character string, and compare the recognized character string with a plurality of character strings in the character database to find a character string corresponding to the recognized character string, wherein each of the plurality of character strings includes one or more characters; wherein if the character string corresponding to the recognized character string is found, the image processor uses the recognized character string as a character recognition result, otherwise, the image processor uses a second CNN model to correct the recognized character string and generate a new recognized character string as the character recognition result.

BRIEF DESCRIPTION OF THE DRAWINGS

The application will become more fully understood by referring to the following detailed description with reference to the accompanying drawings, wherein.

DETAILED DESCRIPTION OF EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It could be understood that the embodiments may be realized in software, hardware, firmware, or any combination thereof.

Embodiments of the application provide a character recognition system and related character recognition method thereof, which may utilize a multi-level structure of a Convolutional Neural Network (hereinafter referred to as "CNN") and a plurality of previously trained CNN models to perform character string detection and mark the position of the character string on an object image (or referred to as an "input image") with characters to be recognized (for example, a house with a doorplate, a vehicle with a license plate, a paper with a character to be recognized, a cloth with a character to be recognized, an image of participants with a number cloth in a sports event, Marathons, races, games, . . . etc., but it is not limited thereto), and further perform character recognition on the character string using a character database and respective character string check error correction mechanism so as to obtain the most likely recognized character string to be output as a recognition result, thus effectively improving the recognition accuracy and the recognition speed.

Figure 1:
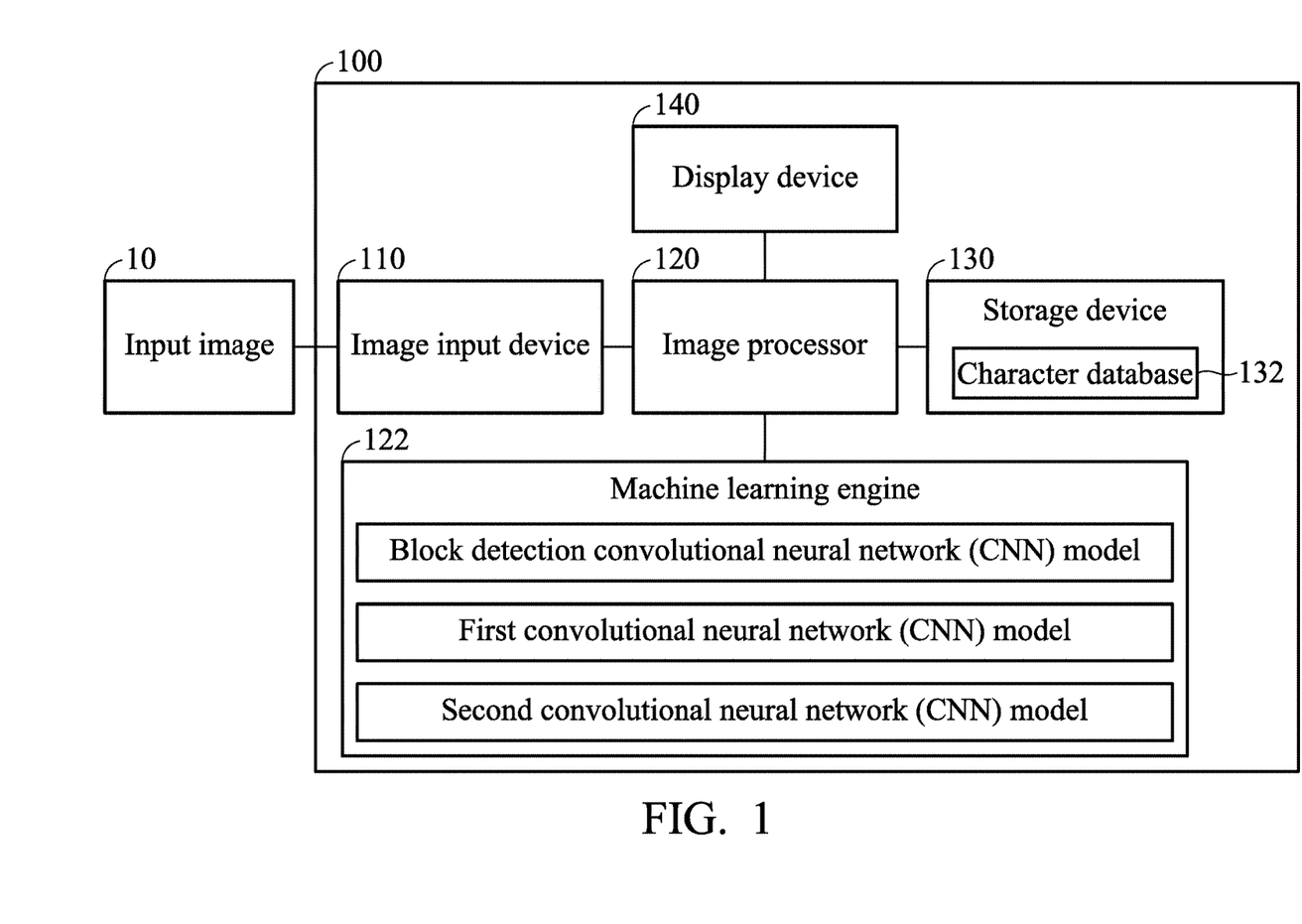
FIG. 1 is a schematic diagram of a character recognition system according to an embodiment.

FIG. 1 is a schematic diagram of a character recognition system 100 according to an embodiment. As shown in FIG. 1, the character recognition system 100 includes at least an image input device 110, an image processor 120, a machine learning engine 122, a storage device 130, and a display device 140. The image input device 110 may be configured to receive or acquire an input image 10 and provide the input image 10 to the image processor 120 for subsequent image analyzing and processing. For example, the character recognition system 100 may be a laptop computer, a desktop computer, a tablet device, or other handheld device (e.g., a smartphone), but the application is not limited thereto. For example, in an embodiment, the image input device 110 may be an image acquisition unit, such as one of an infrared image acquisition device, a Charge Coupled Device (CCD) element or Complementary Metal Oxide Semiconductor (CMOS) sensing element, or any combination thereof, and the application is not limited thereto. The input image 10 may be a picture or a frame of a video (film), and the input image 10 includes a character string to be recognized. The types of characters in the character string to be recognized may be at least one of various types of symbols, various types of letters (including alphabets of various countries), various types of numbers, various types of texts, or any combination of at least two of the foregoing. In an embodiment, the character string to be recognized may be a character string including at least one character type, for example, containing at least one English letter and at least one Arabic numeral, such as a character string "B7", "A12345", etc. In some other embodiments, the character string to be recognized may be a character string that includes only a single character type, such as a character string containing at least one English letter, e.g. a character string "Z", "AB", "ABODE" and so on, or a character string containing at least one Arabic numeral, e.g. a character string "9", "56", "1234" and so on, but the application is not limited thereto. For ease of explanation, in the embodiments of the latter paragraphs, will use the input image 10 is a photograph or a video (film) of a contestant within an athletic event and the character string to be recognized is the characters on the number cloth of the contestant on the photograph or video (film), for the purpose of illustrating possible embodiments of the application. Those who are skilled in this technology may still make various alterations and modifications without departing from the scope and spirit of this application.

The image processor 120 which is coupled to the image input device 110 and the storage device 130, that may be used to execute one or more types of computer-readable mediums stored within the storage devices 130 and execute instruction set and/or program codes to perform the character recognition method of the present application based on the input image provided by the image input device 110, which will be discussed further in the following paragraphs. The image processor 120 may be a Central Processing Unit (CPU), Micro-Control Unit (MCU), Graphics Processing Unit (GPU), Digital Signal Processor (DSP), or the like, which provides the function of image data analyzing, processing and computing. The storage device 130 may be a non-volatile storage medium (e.g., Read-Only Memory (ROM), Flash memory, magnetic tape, hard disk, or optical disc), or a volatile storage medium (e.g., Random Access Memory (RAM)), or any combination thereof for storing data, such as intermediate data generated during the calculation process and the recognition result information and so on. In some embodiments, the storage device 130 may store the input image(s) 10 in advance, and the image processor 120 may directly access the input image(s) 10 from the storage device 130 for subsequent processing without passing through the image input device 110.

The storage device 130 may further include a character database 132 that accesses a plurality of character strings, and the character strings stored in the character databases 132 may be used for subsequent character recognition. For example, the character database 132 may store a list of possible character strings for all actual contestants, the image processor 120 may then compare to the recognition result with the character string stored in the character database 132 to determine whether the recognition result is correct or valid.

The machine learning engine 122 may train a plurality of CNN models to perform character string detection and recognition on the input image 10 according to a machine learning algorithm or mechanism. Each of the CNN models uses a multi-layer CNN structure to extract features. Feature extraction and classification are performed in each layer of CNN, and the output of the previous layer is used as the input of the current layer. In the feature extraction phase, CNN may extract the main features and through the subsequent subsampling, in addition to reducing the feature dimension of the training network, and may also achieve the effect of translation invariance.

Figure 6:
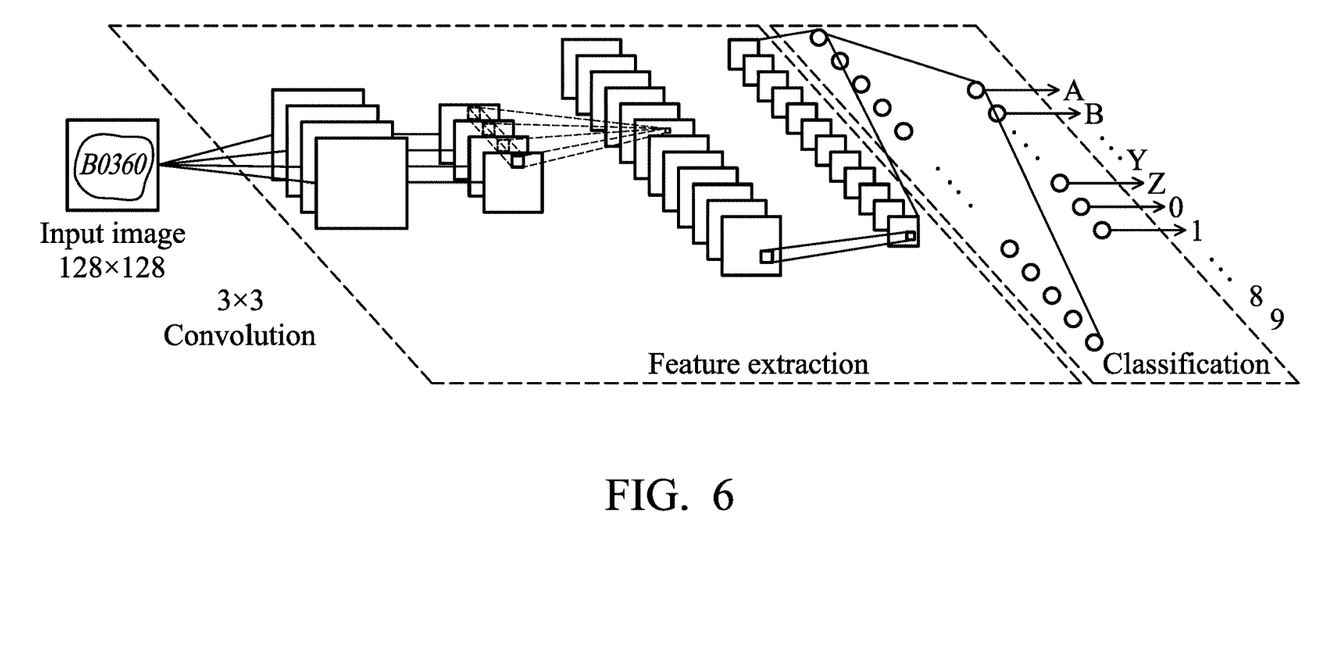
FIG. 6 is a schematic diagram illustrating an exemplary configuration of a CNN model according to an embodiment.

In the illustrated embodiment of FIG. 1, the neural network used by the machine learning engine 122 is a CNN and the CNN model being used includes at least a block detection CNN model, a first CNN model, and a second CNN model. Each CNN model may have a configuration as shown in FIG. 6. FIG. 6 is a schematic diagram illustrating an exemplary embodiment of the configuration of a CNN model of the application. As shown in FIG. 6, the CNN model includes multiple layers, which may perform the feature extraction and classification on the input image through training and learning mechanisms of the CNN network. The CNN layers are arranged in order as below: an input layer, a plurality of convolution layers, a plurality of pooling layers, a plurality of full-connect layers, and then a classification layer. The convolution layer may further include a feature extraction layer and a feature mapping layer. The input of the neurons of the feature extraction layer is connected with the local accepting domain of the previous layer to extract the local feature(s). The feature mapping layer is mapping through multiple features, in which each mapping is a plane, and the weights of neurons on a same feature map are the same, so that may achieve parallel learning. Performing the feature mapping and extraction on the input image 10 through the plurality of convolution layers of the CNN model, and completing whole classification process through the full-connection layer and the classification layer so as to obtain a recognized character string.

Explain in detail, the input of the block detection CNN model is the input image 10, which is arranged for detecting the input image 10 to directly locate the region-of-interest (ROI) in the input image 10. The machine learning engine 122 may provide a large number of input images 10 including the ROIs in advance to be trained by the CNN, and the CNN may find the abstract feature definitions of the ROIs to obtain the block detection CNN model. Thereafter, the machine learning engine 122 may detect the ROIs in the input image 10 through the block detection CNN model. For example, when an input image 10 (or so called object image with character(s) to be recognized) is a whole body image of a contestant that includes a number cloth, the ROIs may be a region in which the number cloth is located. The CNN model is configured to recognize the region in which the number cloth is located. The first CNN model is configured to recognize a character string (e.g., a number and/or a character symbol) within the number cloth. The second CNN model is configured to correct part of the recognized character string (for example, the number), when the character recognized by the first CNN model is invalid or incorrect, to improve the recognition accuracy. Since the embodiment of the application may detect the position of the number cloth in the input image 10, only the characters in the number cloth are required to be recognized thereby may effectively eliminate other identification disturbances in other images (for example, characters in the non-number cloth) and providing character recognition capability for non-positive humanoid or non-human torso objects, such as character recognition on an animal. It should be noted that details of specific machine learning-based mechanisms may be practiced by various processing techniques which are well-known by those skilled in the art, and thus such details are omitted here for brevity.

The display device 140 may be any device capable of displaying or presenting recognition results. The display device 140 may display related data, such as texts, figures, interfaces, and/or information such as displaying or presenting recognition results. The display device 140, such as a liquid crystal display (LCD) etc., may be configured to present an image of the recognition results (including any image format, such as bmp, jpg, png and other formats etc.) or display the results of the recognition. It could be understood that, in some embodiments, the display device 140 may be a screen integrated with a touch-sensitive device (not shown). The touch-sensitive device has a touch-sensitive surface comprising sensors in at least one dimension to detect contact and movement of at least one object (input tool), such as a pen/stylus or finger near or on the touch-sensitive surface. Therefore, users may be able to input commands or signals via the display device 140.

It could be understood that each of the elements or modules in the presented embodiments may be a device having a corresponding function, which may have the appropriate hardware circuits or elements to perform the corresponding function, however, the device is not limited to be entity device, which may also be a virtual device having program codes and software(s) with respective functions or a device having capabilities for processing and running the program codes and software(s). The manner of operations of the respective elements may further refer to the following description of the methods. Therefore, the character recognition system 100 may control the operation of each CNN model in the machine learning engine 122 through the image processor 120.

Figure 2:
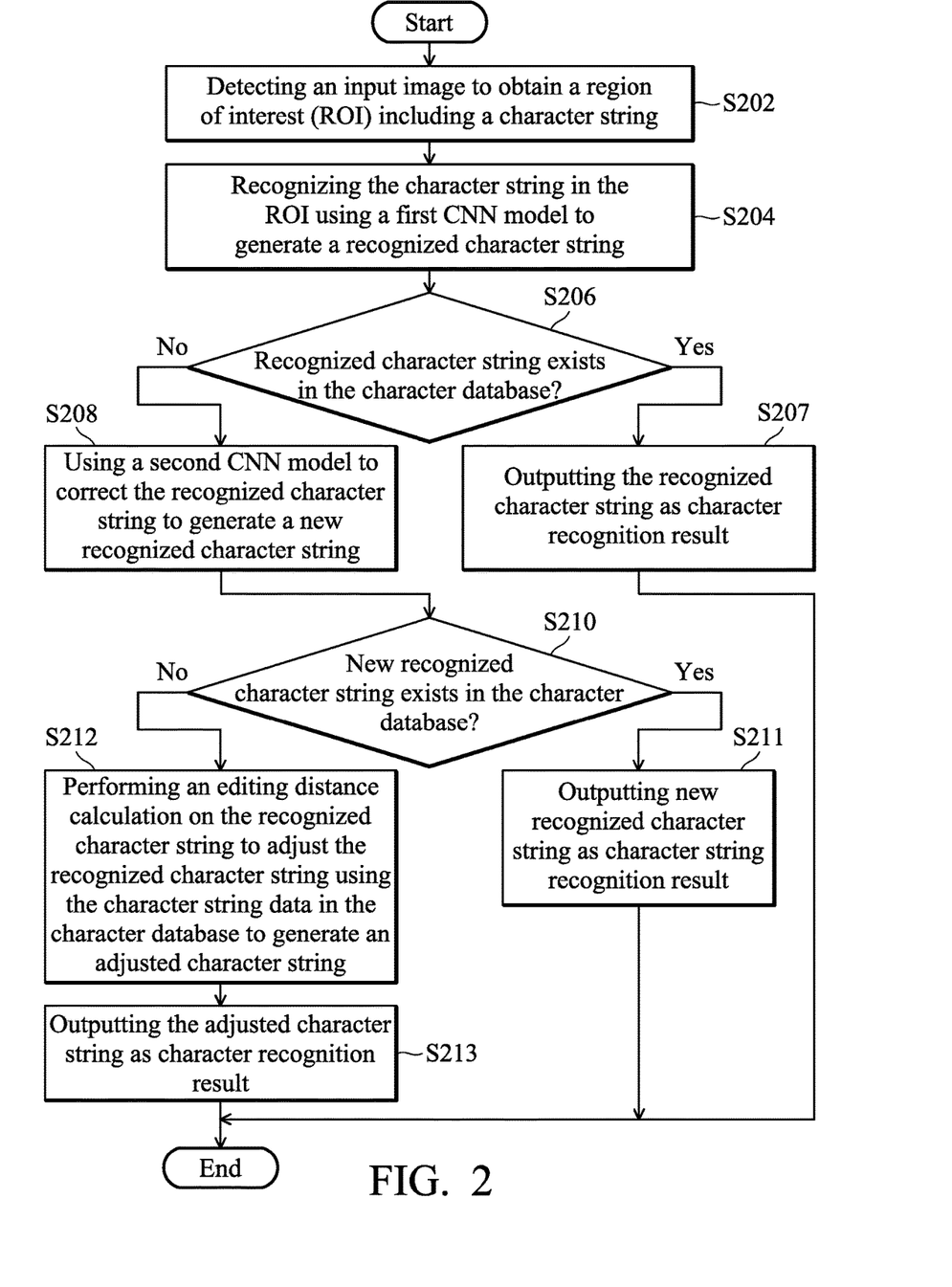
FIG. 2 is a flowchart of a character recognition method according to an embodiment.

FIG. 2 is a flowchart of a character recognition method according to an embodiment of the application. Please refer together with FIG. 1 and FIG. 2. The character recognition method in accordance with the embodiments of the application may be applied to a character recognition system, for example, the character recognition system 100 as shown in FIG. 1, and the method may be performed by the image processor 120.

First, as shown in step S202, the image processor 120 detects an input image 10 to acquire an ROI including a character string. In an embodiment, the image processor 120 uses the block detection CNN model in the machine learning engine 122 to detect the input image to obtain the ROI with a character string and normalize the ROI. In this step, the machine learning engine 122 performs detection of ROIs on the input image 10 and the detection of ROIs may be performed by using the pre-trained block detection CNN model. For example, the ROI may be a number cloth containing a character string, and the block detection CNN model may detect the input image 10 to recognize the block in which the number cloth is located. After the ROI including a character string has been detected, the frame of the ROI in the input image 10 is further normalized and scaled to a specified size (for example, scaling the size of the frame of the ROI to 128×128 pixels). The image processor 120 then uses the pre-trained character-string-recognition CNN model and performs character string (e.g., number) recognition using the frame of the ROI scaled to the specified size as the input of the character-string-recognition CNN model.

Next, as shown in step S204, the image processor 120 performs a character string recognition on the character string of the ROI to generate a recognized character string using the first CNN model. For example, when the ROI is a number cloth containing a number, the first CNN model may perform number recognition on the whole number on the number cloth and generate a recognized number representing the recognition result upon completion of the recognition. For example, as the number string of the number cloth may consist of any combination of 26 alphanumeric characters and 10 Arabic numerals, each symbol has 36 possible recognition results.

After generating the recognized character string, as shown in step S206, the image processor 120 determines whether the recognized character string exists in the character database 132. The character database 132 includes a plurality of character strings and each character string may include one or more characters. Explain in detail, it is determined whether the recognized character string exists in the character database 132 by comparing the recognized character string with a plurality of character strings in the character database 132 to find whether there is a character string corresponding to the recognized character string in the character database 132. When a character string corresponding to the recognized character string can be found in the character database 132, it is determined that the recognized character string exists in the character database 132.

When the recognized character string exists in the character database 132 ("Yes" in the step S206), as shown in step S207, it means that the recognition succeeds, and the recognized character string is output as a character string recognition result. For example, if the recognized character string is "A12345", the recognition is indicated as successful when the character string "A12345" can be found in the character database 132.

Contrarily, when the recognized character string does not exist in the character database 132 ("No" in the step S206), that is, no character string corresponding to the recognized character string can be found in the character database 132, it indicates that the recognition is fail, and then as shown in step S208, the image processor 120 corrects the recognized character string using the second CNN model to generate a new recognized character string.

Figure 3:
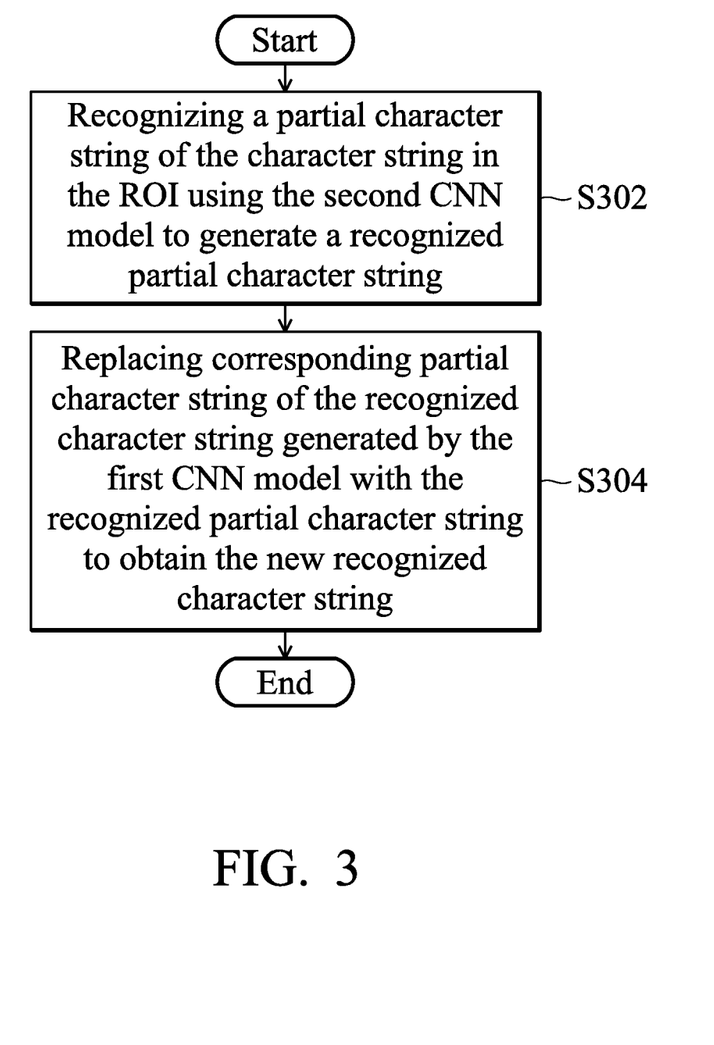
FIG. 3 is a flowchart of a method for correcting the recognized character string using a second CNN model according to an embodiment.

In some embodiments, the correction of the recognized character string using the second CNN model may be performed by recognizing a partial character string within a specific position of the character string in the ROI using the second CNN model and replacing the aforementioned partial character string within the specific position of the recognized character string with a new partial character string, wherein the positions of the partial character string being replaced are the same as those of the new partial character and wherein the character string in the ROI includes a plurality of characters and the number of characters of the partial string is smaller than the number of characters of the character string in the ROI. The details of step S208 are shown in FIG. 3. FIG. 3 is a flowchart of a method for correcting the recognized character string using the second CNN model according to an embodiment of the application, which may be performed by the image processor 120.

When the recognized character string is not exist in the character database 132, as shown in step S302, the image processor 120 recognizes a partial character string within a specific position of the ROI using the second CNN model, generates a recognized partial character string, and after the recognized partial character string is generated, as shown in step S304, the corresponding partial character string of the recognized character string generated by the first CNN model is replaced with the recognized partial character string at the same position to obtain the new recognized character string of step S208. For example, if the whole string in the ROI is "A12345", the recognized partial string may be "345", "123", or "2345". When the recognized character string generated by the first CNN model is "A12386", the corresponding partial character string "386" in "A12386" then is replaced with the recognized partial character string "345" to obtain a new recognized character string "A12345". Relevant details of calculation for the number of characters and corresponding character positions of the partial character string will be described below with reference to FIG. 4.

Figure 4:
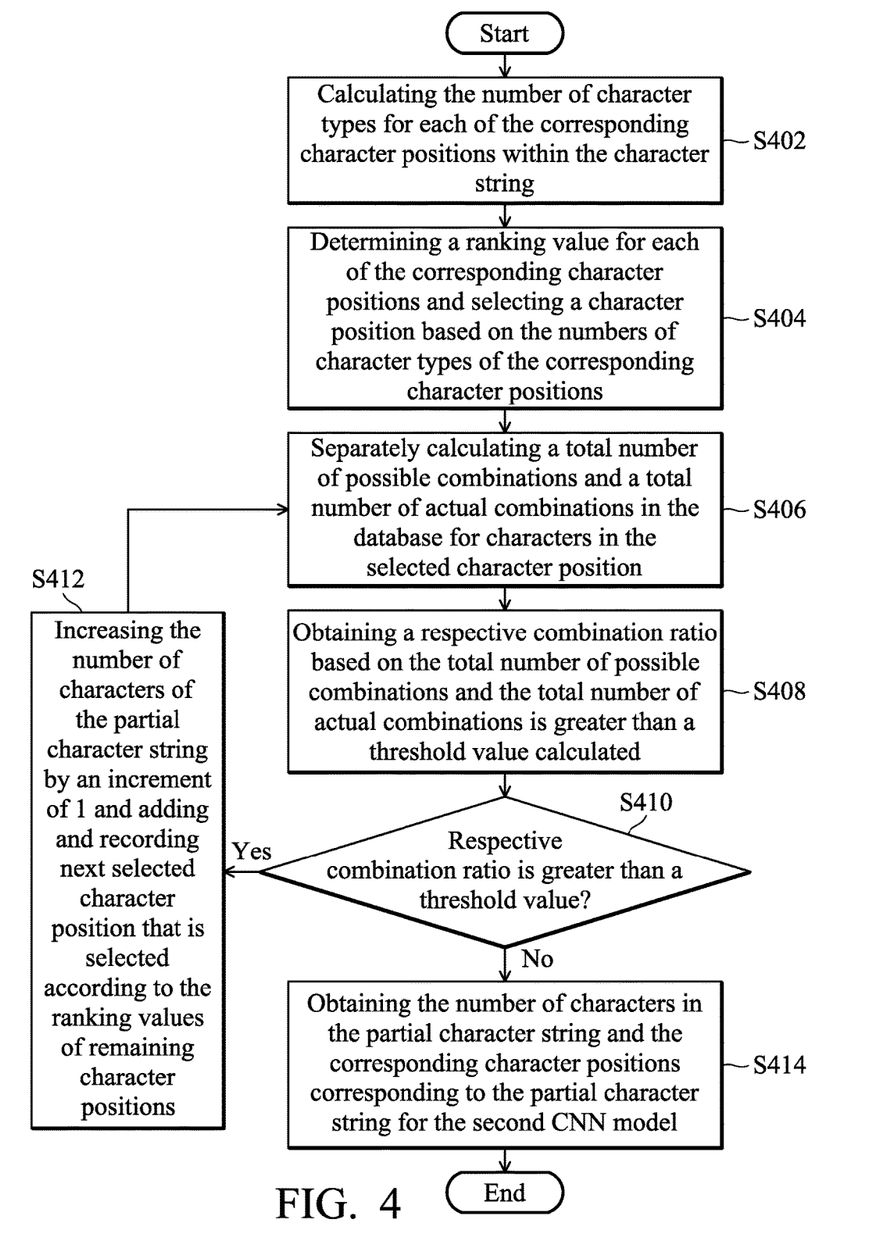
FIG. 4 is a flowchart of a method for calculating the number of characters and the corresponding character position for a partial string applied to a second CNN model according to an embodiment.

FIG. 4 is a flowchart of a method for calculating the number of characters and the corresponding character position for a partial string applied to the second CNN model according to an embodiment of the application, which may be performed by the image processor 120.

First, the image processor 120 calculates the number of character types at each character position in the character string (step S402). Then, the image processor 120 determines a ranking value of each character position and selects one of the character positions based on the number of character types of each character position (step S404). After the character position being selected has been determined, the image processor 120 calculates a total number of possible combinations and a total number of actual combinations for the characters of the selected character position in the database, respectively (step S406). Thereafter, the image processor 120 obtains a respective combination ratio (i.e., the total number of actual combination/the total number of possible combinations) based on the total number of possible combinations and the total number of actual combinations calculated (step S408). The image processor 120 then determines whether the respective combination ratio is greater than a preset threshold value (step S410). If the respective combination ratio is greater than the threshold value, the image processor 120 increases the number of characters of the partial character string by an increment of 1, adds and records the next selected character position based on the ranking values of the remaining character positions (step S412) and re-performs the determinations from step S406 to step S410. If the respective combination ratio is not greater than the threshold value, the image processor 120 then obtains the number of characters of the partial character string corresponding to the second CNN model and the character positions corresponding to the partial character string (step S414).

Explain in detail, it is assumed that $S=\{S_n S_{n-1} \ldots S_x \ldots S_1\}$ is a character string to be recognized, each of $S_1, \ldots, S_n$ is an individual character, n is a word length, $|S_x|$ is the number of character types of character $S_x$ (where $1 \leq x \leq n$), T is a predetermined threshold value, P is a substring (a string to be recognized by the second CNN) formed by combining all of the characters, each of $P_1, \ldots, P_k$ is an individual character, k is a character string length, $|P_y|$ is the number of character types of character $P_y$ (where $1 \leq y \leq k$) and C(P) is the number of strings calculated for P in the character database. In such case, the combination ratio of each substring may be expressed as $R=C(P)/\pi_1^k|P_k|$. Then, when the combined ratio is larger than the threshold value (R>T), the number of digits and the digit positions of which to be trained may be determined by finding the partial string P with the longest length (maximum k).

For example, suppose the maximum number of a game is 2799, the positions of the characters of the number are in digit places of units, tens, hundreds and thousands, wherein the number of types for each character may be calculated in advance to find that the units digit may have 10 types (i.e., the digits 0-9), the tens digit may have 10 types (i.e., the digits 0-9), the hundreds digit may have 8 types (i.e., the digits 0-7) and the thousands digit may have 3 types (i.e., the digits 0-2). In this embodiment, the statistical order of the digits obtained may be the units digit or the tens digit first, followed by the hundreds digit or the thousands digit sequentially, depending on the number of digits of the aforementioned individual digits. In this embodiment, the units digit is used as the start digit to calculate the total number of possible combinations of the characters in the character database and the total number of actual combinations of the characters in the character database, and then calculate a combination ratio of the actual combinations and the possible combinations for this digit. Then, it is determined whether the combination ratio calculated for the units digit is greater than the threshold value, and if it is smaller than the threshold value, the number of characters for training in the second CNN model is determined to be 1 and the corresponding character position is the units digit. In another embodiment, if the combination ratio calculated for the units digit is greater than the threshold value, an additional character position is added to continue the next character position decision at next round. In other words, the tens digit is added for the next round of determination to calculate the total numbers of possible combinations and the total numbers of actual combinations of the characters in the character database for characters containing both the units digit and the tens digit, and then calculate a combination ratio of the actual combinations and the possible combinations for these two digits. If it is assumed that the combination ratio of the fourth character added is smaller than the threshold value, for example, the threshold value is 0.9, it means that when training the second CNN model, the number of training characters is set to be 3 and the corresponding character positions are the hundreds digit, the tens digit, and the units digit. It could be understood that the number of characters used to determine the training of the second CNN model and its position may be determined by selecting a different threshold value, thereby improving the overall recognition accuracy.

Figure 7:
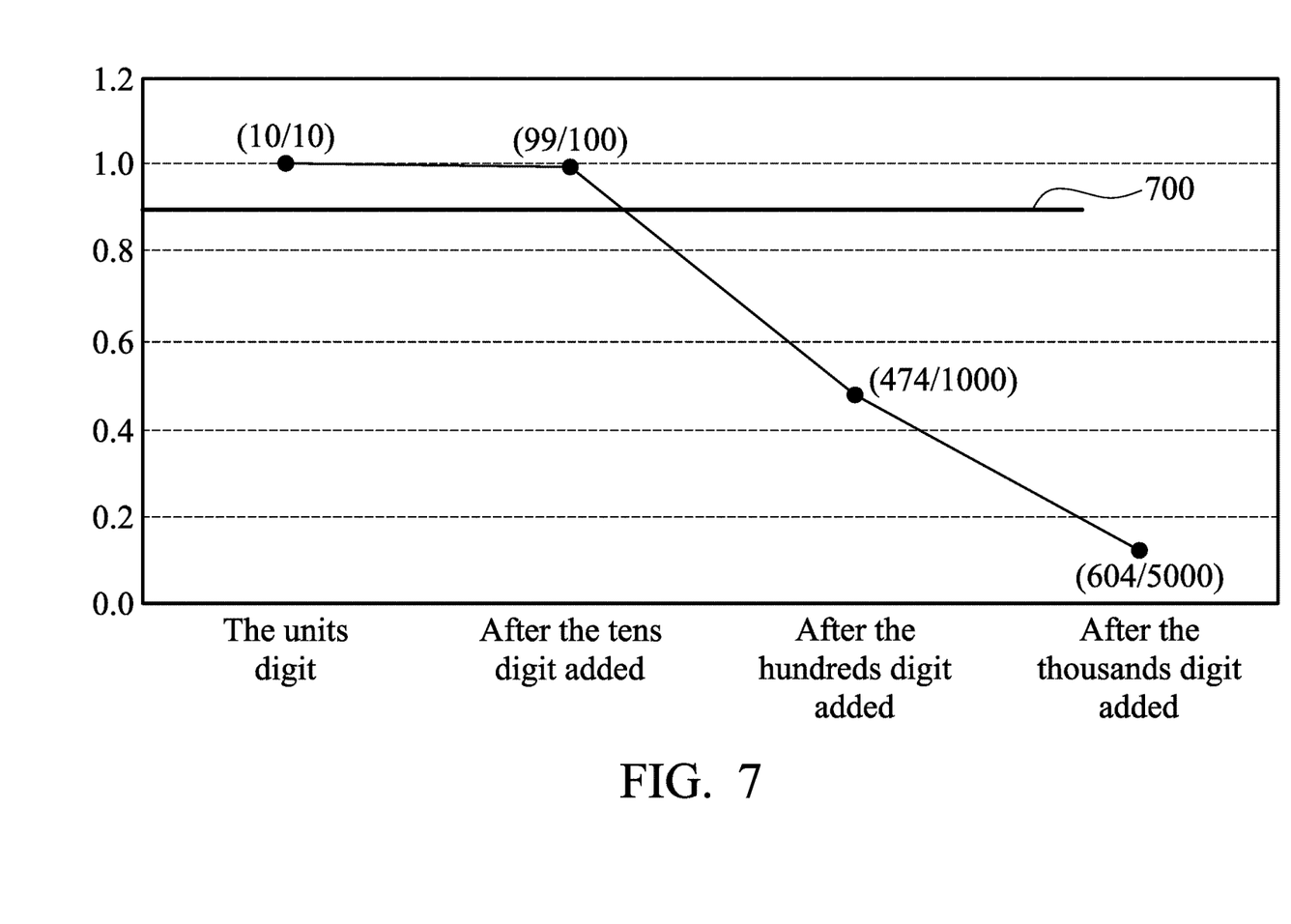
FIG. 7 is a schematic diagram illustrating an exemplary ratio of the number of possible combinations and the number of actual combinations according to an embodiment.

FIG. 7 is a schematic diagram illustrating an exemplary embodiment of a ratio of the number of possible combinations and the number of actual combinations of the application. As shown in FIG. 7, the units digit represented as (10/10) indicates the possible combinations of 10 types and the actual combinations also being 10 types, the tens digit added to the digit represented as (99/100) indicates the possible combinations of 100 types while the actual combinations being only 99 types, and so on. The number of possible combinations depends on the number of participants registered, while the number of actual combinations depends on the number of participants actually participated. Because some people may register but did not participate, so the number of actual combinations may be less than the number of possible combinations. In this example, assuming that the threshold value 700 is set to 0.9, as the ratio after the hundreds digit has been added is 474/1000 and less than 0.9, the number of characters to be trained may be determined to be 2 and their corresponding character position may also be determined as the tens digits and the units digit from the statistical results shown in FIG. 7.

Referring again to the embodiment of FIG. 2, after generating the new recognized character string in step S208, as shown in step S210, the image processor 120 determines whether the new recognized character string exists in the character database 132. Similarly, it is determined whether the new recognized character string exists by comparing the new recognized character string with a plurality of character strings in the character database 132 to find whether there is a character string corresponding to the new recognized character string in the character database 132. When a character string corresponding to the new recognized character string may be found in the character database 132, it is determined that the new recognized character string exists in the character database 132.

When the new recognized character string exists in the character database 132 ("Yes" in the step S210), as shown in step S211, it means that the recognition succeeds, and thus the image processor 120 outputs the new recognized character string as a character string recognition result. Contrarily, when the new recognized character string does not exist in the character database 132 ("No" in the step S210), that is, no character string corresponding to the new recognized character string may be found in the character database 132, it indicates that the recognition is fail, and then as shown in step S212, the image processor 120 performs an editing distance calculation on the recognized character string to adjust the recognized character using the character string data in the character database 132 to generate an adjusted character string. The details of generation of the adjusted character string are shown in the following FIG. 5.

Figure 5:
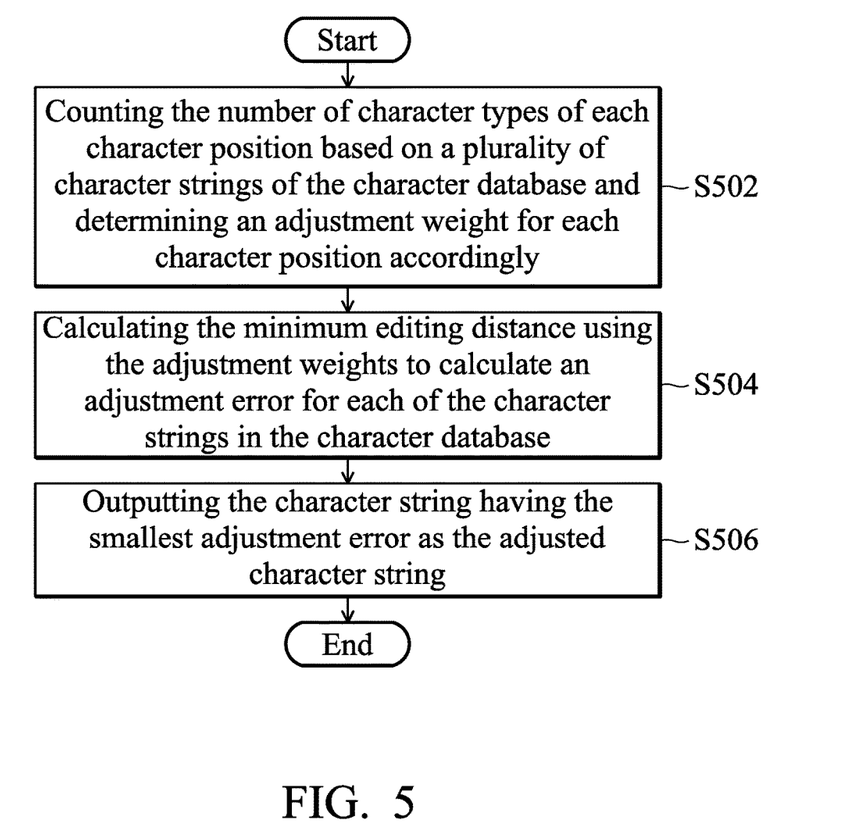
FIG. 5 is a flowchart of a method of generating an adjusted character string according to an embodiment.

FIG. 5 is a flowchart of a method of generating an adjusted character string according to an embodiment of the application. Please refer together with FIG. 1 and FIG. 5. The method of generating the adjusted character string in accordance with the embodiment may be applied to the character recognition system 100 as shown in FIG. 1 and performed by the image processor 120.

First, as shown in step S502, the image processor 120 counts the number of character types of each character position based on a plurality of character strings of the character database 132, and determines an adjustment weight for each character position. For example, assume that the character position of the numbers in the character database 132 has a units digit, a tens digit, a hundreds digit, and a thousands digit, where the units digit has 10 types (i.e., the digits 0-9), the tens digit has 10 types (i.e., the digits 0-9), the hundreds digit has 8 types (i.e., the digits 0-7), and the thousands digit has 3 types (i.e., the digits 0-2), the image processor 120 may assign different adjustment weight for each character position based on the number of character types of each character position.

Next, as shown in step S504, the image processor 120 calculates the minimum editing distance using the adjustment weights to calculate an adjustment error for each of the character strings in the character database 132. Editing distance may be referred to as the minimum number of editing operations required to convert from one string to another. Permitted editing operations include replacing one character with another, inserting a character, and deleting a character. Generally speaking, the smaller the editing distance is, the greater the similarity of the two strings is. The editing distance may be applied to spelling correction or to calculate the degree of similarity between the two sequences. In this embodiment, different adjustment weight may be assigned to each character position according to the number of character positions for each character position to perform the minimum editing distance calculation based on the adjustment weight assigned, so that the relationship between the number of types of digits may be further considered to select the most similar string to increase the recognition success rate.

After calculating the adjustment error for each character string in the character database, as shown in step S506, the image processor 120 outputs the character string having the smallest adjustment error as the adjusted character string in step S212.

Referring back to FIG. 2, after generating the adjusted character string in step S212, as shown in step S213, the image processor 120 outputs the adjusted character string as a character recognition result.

In some embodiments, the image processor 120 may further use a third CNN model (not shown) to correct the new recognized character string when the new recognized character string does not have a corresponding character string in the database, and then use the corrected character string to compare the character strings in the database. A partial string of the third CNN model may be similar to the partial string of the second CNN model or it may be a character string other than the partial string of the second CNN model. The generation and determination of partial strings of the third CNN model is similar to that of the second CNN model, details of which are omitted here for brevity.

Thus, the character recognition system and the character recognition method thereof of the present application may be applied to character strings having different colors and may tolerate a certain degree of warping, translation, shadowing and shading of part of the image of ROI along with its character string. In addition, the character recognition system and the character recognition method thereof of the present application may employ a hierarchical convolutional neural network architecture and use the character database and the spelling check error correction mechanism for character recognition to output the most possible character recognition result analyzed, thus may have better recognition result and higher accuracy rate than any existing methods.

Methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the application has been described by way of example and in terms of exemplary embodiment, it is to be understood that the application is not limited thereto. Those who are skilled in this technology may still make various alterations and modifications without departing from the scope and spirit of this application. Therefore, the scope of the present application shall be defined and protected by the following claims and their equivalents.

What is claimed is:

1. A character recognition method applied to a character recognition system including a storage device and an image processor, comprising:
   recognizing a character string, which includes one or more characters, in a region of interest (ROI) using a first convolutional neural network (CNN) model to generate a recognized character string; and
   comparing the recognized character string with a plurality of character strings in a character database to find a character string corresponding to the recognized character string, wherein each of the plurality of character strings includes one or more characters,
   wherein if the character string corresponding to the recognized character string is found, using the recognized character string as a character recognition result, otherwise, using a second CNN model to correct the recognized character string and generate a new recognized character string as the character recognition result.

2. The character recognition method as claimed in claim 1, wherein the ROI is obtained by detecting an input image using a block detection CNN model, and the ROI is normalized.

3. The character recognition method as claimed in claim 2, wherein the input image is a picture or a frame of a video.

4. The character recognition method as claimed in claim 2, wherein the block detection CNN model, the first CNN model, and the second CNN model are pre-trained CNN models.

5. The character recognition method as claimed in claim 1, wherein the plurality of character strings comprise at least one of various types of symbols, various types of letters, various types of numbers, various types of texts, or any combination of at least two of above.

6. The character recognition method as claimed in claim 1, further comprising:
   comparing the new recognized character string with the plurality of character strings in the character database to find a character string corresponding to the new recognized character string; and
   if the character string corresponding to the new recognized character string is found, outputting the new recognized character string, and if the character string corresponding to the new recognized character string is not found, using a third CNN model to correct the new recognized character string.

7. The character recognition method as claimed in claim 1, wherein the step of using the second CNN model to correct the recognized character string to generate the new recognized character string further comprises:
   recognizing a partial character string of the character string in the ROI using the second CNN model to generate a recognized partial character string; and
   replacing corresponding partial character string of the recognized character string generated by the first CNN model with the recognized partial character string to obtain the new recognized character string, wherein the character string in the ROI includes a plurality of characters and a number of characters of the partial character string is smaller than a number of characters of the character string in the ROI.

8. The character recognition method as claimed in claim 7, wherein each of the characters in the character string in the ROI has a corresponding character position, and the method further comprises:
   calculating a number of character types for each of the corresponding character positions;
   determining a ranking value for each of the corresponding character positions based on the number of character types of the corresponding character positions; and
   sequentially calculating a total number of possible combinations and a total number of actual combinations for each of the corresponding character positions based on ranking values of the corresponding character positions, and when a combination ratio of the total number of possible combinations and the total number of actual combinations is greater than a threshold value, increasing the number of characters of the partial character string by an increment of 1, and adding and recording next selected character position that is selected according to the ranking values of remaining character positions until the combination ratio is less than the threshold value, so as to obtain the number of characters in the partial character string and the corresponding character positions corresponding to the partial character string for the second CNN model.

9. The character recognition method as claimed in claim 1, further comprising:
   comparing the new recognized character string with the plurality of character strings in the character database to find a character string corresponding to the new recognized character string; and
   if the character string corresponding to the new recognized character string is found, outputting the new recognized character string, and if the character string corresponding to the new recognized character string is not found, correcting the new recognized character string using an editing distance calculation to generate an adjusted character string using character string data in the character database and outputting the adjusted character string.

10. The character recognition method as claimed in claim 9, further comprising:
    counting a number of character types at each character position according to the character database and determining an adjustment weight for each character position based on the number of character types corresponding thereto;

performing the editing distance calculation using the adjustment weight to calculate an adjustment error for each of the plurality of character strings in the character database; and outputting the character string having the smallest adjustment error as the adjusted character string.

11. A character recognition system, comprising:

a storage device, storing a character database; and an image processor coupled to the storage device, configuring to recognize a character string, which includes one or more characters, in a region of interest (ROI) using a first convolutional neural network (CNN) model to generate a recognized character string, and compare the recognized character string with a plurality of character strings in the character database to find a character string corresponding to the recognized character string, wherein each of the plurality of character strings includes one or more characters, wherein if the character string corresponding to the recognized character string is found, the image processor uses the recognized character string as a character recognition result, otherwise, the image processor uses a second CNN model to correct the recognized character string and generate a new recognized character string as the character recognition result.

12. The character recognition system as claimed in claim 11, wherein the image processor obtains the ROI by detecting an input image using a block detection CNN model, and the ROI is normalized.

13. The character recognition system as claimed in claim 12, wherein the input image is a picture or a frame of a video.

14. The character recognition system as claimed in claim 12, wherein the block detection CNN model, the first CNN model, and the second CNN model are pre-trained CNN models.

15. The character recognition system as claimed in claim 11, wherein the plurality of character strings comprise at least one of various types of symbols, various types of letters, various types of numbers, various types of texts, or any combination of at least two of above.

16. The character recognition system as claimed in claim 11, wherein the image processor further compares the new recognized character string with the plurality of character strings in the character database to find a character string corresponding to the new recognized character string, and if the character string corresponding to the new recognized character string is found, outputs the new recognized character string, and if the character string corresponding to the new recognized character string is not found, uses a third CNN model to correct the new recognized character string.

17. The character recognition system as claimed in claim 11, wherein the image processor further recognizes a partial character string of the character string in the ROI using the second CNN model to generate a recognized partial character string, and replaces corresponding partial character string of the recognized character string generated by the first CNN model with the recognized partial character string to obtain the new recognized character string, wherein the character string in the ROI includes a plurality of characters and a number of characters of the partial character string is smaller than a number of characters of the character string in the ROI.

18. The character recognition system as claimed in claim 17, wherein each of the characters in the character string in the ROI has a corresponding character position, and the image processor further calculates a number of character types for each of the corresponding character positions, determines a ranking value for each of the corresponding character positions based on the number of character types of the corresponding character positions, and sequentially calculates a total number of possible combinations and a total number of actual combinations for each of the corresponding character positions based on ranking values of the corresponding character positions, and when a combination ratio of the total number of possible combinations and the total number of actual combinations is greater than a threshold value, increases the number of characters of the partial character string by an increment of 1, and adds and records next selected character position that is selected according to the ranking values of remaining character positions until the combination ratio is less than the threshold value, so as to obtain the number of characters in the partial character string and the corresponding character positions corresponding to the partial character string for the second CNN model.

19. The character recognition system as claimed in claim 11, wherein the image processor further compares the new recognized character string with the plurality of character strings in the character database to find a character string corresponding to the new recognized character string and if the character string corresponding to the new recognized character string is found, outputs the new recognized character string, and if the character string corresponding to the new recognized character string is not found, corrects the new recognized character string using an editing distance calculation to generate an adjusted character string using character string data in the character database and outputs the adjusted character string.

20. The character recognition system as claimed in claim 19, wherein the image processor further counts a number of character types at each character position according to the character database and determining an adjustment weight for each character position based on the number of character types corresponding thereto, performs the editing distance calculation using the adjustment weight to calculate an adjustment error for each of the plurality of character strings in the character database, and outputs the character string having the smallest adjustment error as the adjusted character string.

* * * * *